(12) United States Patent
Ro

(10) Patent No.: US 12,388,323 B2
(45) Date of Patent: Aug. 12, 2025

(54) CONTROL SYSTEM FOR ELECTRIC LAWNMOWER AND ELECTRIC LAWNMOWER INCLUDING SAME

(71) Applicant: Honda Motor Co., Ltd., Tokyo (JP)

(72) Inventor: Kyusang Ro, Chapel Hill, NC (US)

(73) Assignee: HONDA MOTOR CO., LTD., Tokyo (JP)

(*) Notice: Subject to any disclaimer, the term of this patent is extended or adjusted under 35 U.S.C. 154(b) by 879 days.

(21) Appl. No.: 17/571,875

(22) Filed: Jan. 10, 2022

(65) Prior Publication Data

US 2023/0223819 A1  Jul. 13, 2023

(51) Int. Cl.
| H02K 5/22 | (2006.01) |
| A01D 34/00 | (2006.01) |
| A01D 34/68 | (2006.01) |
| A01D 34/78 | (2006.01) |
| A01D 34/82 | (2006.01) |
| H02K 5/20 | (2006.01) |
| H02K 7/00 | (2006.01) |
| H02K 7/14 | (2006.01) |
| H02K 9/14 | (2006.01) |
| A01D 101/00 | (2006.01) |

(52) U.S. Cl.
CPC ............ *H02K 9/14* (2013.01); *A01D 34/006* (2013.01); *A01D 34/6806* (2013.01); *A01D 34/78* (2013.01); *A01D 34/82* (2013.01); *H02K 5/20* (2013.01); *H02K 5/225* (2013.01); *H02K 7/003* (2013.01); *H02K 7/14* (2013.01); *A01D 2101/00* (2013.01)

(58) Field of Classification Search
CPC . H02K 5/225; H02K 5/20; H02K 9/14; A01D 34/001; A01D 34/006
See application file for complete search history.

(56) References Cited

U.S. PATENT DOCUMENTS

| 2003/0037522 A1* | 2/2003 | Kobayashi ............. A01D 69/02 56/10.8 |
| 2005/0005588 A1 | 1/2005 | Jager |
| 2017/0025717 A1* | 1/2017 | Zeller ............... H01M 10/0422 |

(Continued)

FOREIGN PATENT DOCUMENTS

| CN | 106233918 A | 12/2016 |
| CN | 211671439 U | 10/2020 |

*Primary Examiner* — Tulsidas C Patel
*Assistant Examiner* — Robert E Mates
(74) *Attorney, Agent, or Firm* — IKENEALY VAIDYA LLP

(57) ABSTRACT

An electric lawnmower control system can include a battery, an electric motor configured to rotatably drive a blade, a fan rotatably driven by the electric motor, a printed circuit board, a motor controller, and a housing. The printed circuit board can be fastened to the battery and include a heat sink that is located adjacent to the fan. The motor controller can be mounted on the circuit board, in electrical communication with the battery and the electric motor, thermally coupled to the heat sink, and configured selectively drive the electric motor with electric power supplied by the battery. The housing can include a first side, a second side, and a ventilation passage extending from the first side to the second side. The ventilation passage can be in fluid communication with the fan, and at least a portion of the heat sink is exposed to air flowing through the ventilation passage.

19 Claims, 5 Drawing Sheets

(56) References Cited

U.S. PATENT DOCUMENTS

| | | |
|---|---|---|
| 2019/0208700 A1 | 7/2019 | Hahn et al. |
| 2020/0169148 A1 | 5/2020 | Nakamoto |
| 2020/0315090 A1* | 10/2020 | Hasegawa .......... A01D 34/6806 |

* cited by examiner

CONTROL SYSTEM FOR ELECTRIC LAWNMOWER AND ELECTRIC LAWNMOWER INCLUDING SAME

BACKGROUND

The disclosed subject matter relates to an electric lawnmower. More particularly, the disclosed subject matter relates to methods and an apparatus that can manage power distribution among and cooling of electrical component(s) and/or electronic component(s) of the electric lawnmower.

Lawnmowers can be configured as walk-behind lawnmowers or as riding lawnmowers. An electric lawnmower can be powered by one or more electric motors that can be supplied with power from an external power source via an electric wire or by an on-board power source such as one or more batteries. The electric lawnmower can include an electronic control unit (also referred to as a controller) and at least one operator input for the operator of the lawnmower to signal the controller how to operate the electric lawnmower. The electric lawnmower can include a fan that supplies cooling air that transfers heat from the controller, the electric motor(s), and the battery(ies) to the ambient environment.

SUMMARY

Some embodiments are directed to an electric lawnmower control system that can include a battery, an electric motor configured to rotatably drive a blade, a fan rotatably driven by the electric motor, a printed circuit board, a motor controller, and a housing. The printed circuit board can be fastened to the battery and include a heat sink that is located adjacent to the fan. The motor controller can be mounted on the circuit board, in electrical communication with the battery and the electric motor, thermally coupled to the heat sink, and configured selectively drive the electric motor with electric power supplied by the battery. The housing can include a first side, a second side, and a ventilation passage extending from the first side to the second side. The ventilation passage can be in fluid communication with the fan, and at least a portion of the heat sink is exposed to air flowing through the ventilation passage.

Some embodiments are directed to a control system for an electric lawnmower. The control assembly can include a battery, an electric motor configured to rotatably drive a blade, a fan rotatably driven by the electric motor, printed circuit board, a motor controller, and a housing. The battery assembly can include a battery case and at least one battery mounted in the battery case. The printed circuit board can be mounted on the battery and include a heat sink that is located adjacent to the fan. The motor controller can be mounted on the circuit board, in electrical communication with the battery and the electric motor, thermally coupled to the heat sink, and configured selectively drive the electric motor with electric power supplied by the battery. The housing can include a first side, a second side, and a ventilation passage extending from the first side to the second side. The ventilation passage is in fluid communication with the fan, and at least a portion of the heat sink is exposed to air flowing through the ventilation passage.

Some embodiments are directed to a control system for an electric lawnmower that can include a battery assembly, an electric motor configured to rotatably drive a blade, a fan rotatably driven by the electric motor, a motor controller, a heat sink, and a housing. The battery assembly can include a battery case and at least one battery mounted in the battery case. The motor controller can be in electrical communication with the battery and the electric motor and configured to selectively drive the electric motor with electric power supplied by the battery. The heat sink thermally coupled to the motor controller and located adjacent to the fan. The housing can include a first side, a second side, and a ventilation passage extending from the first side to the second side. The ventilation passage can be in fluid communication with the fan and at least a portion of the heat sink.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
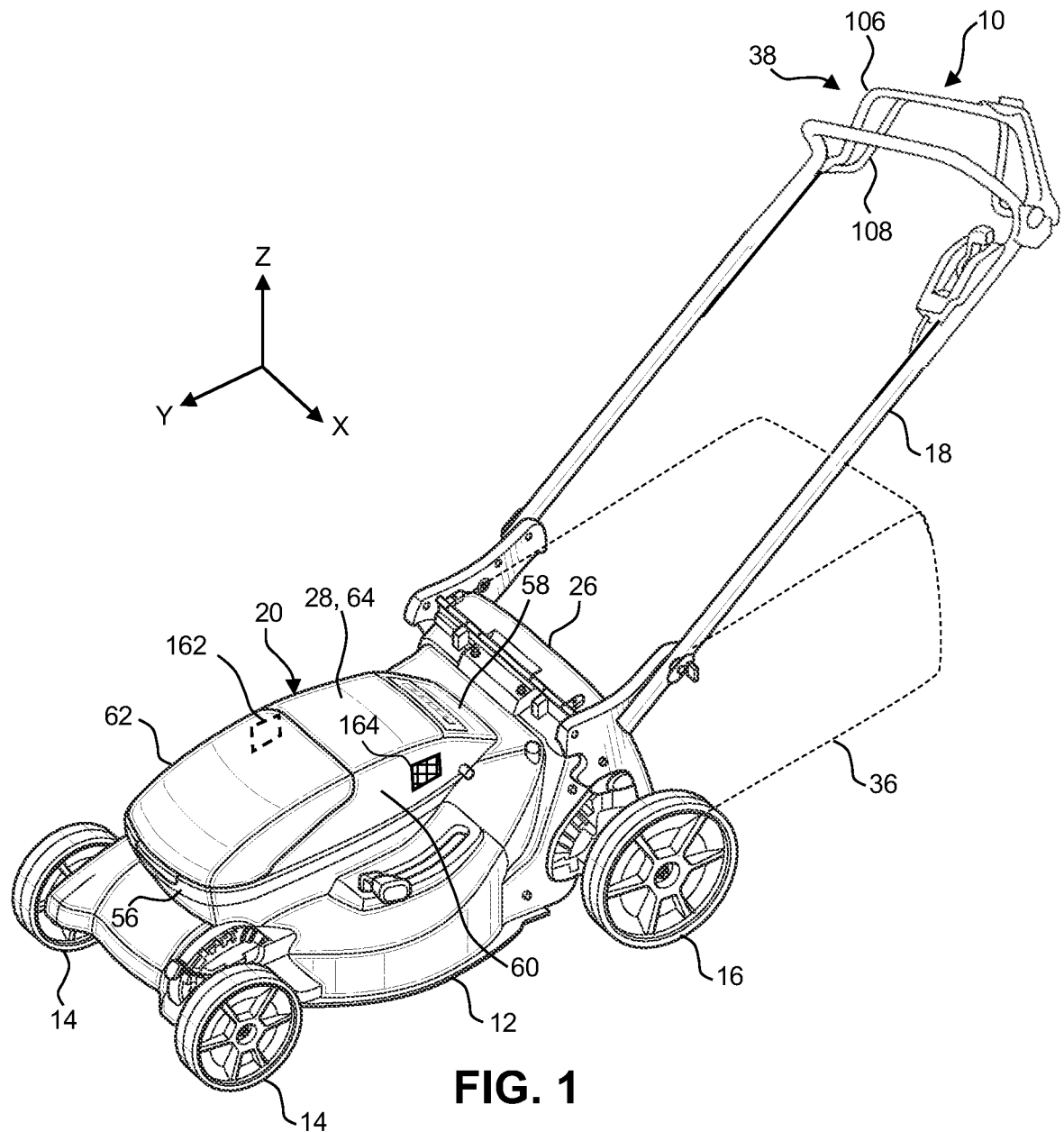
FIG. 1 is a perspective view of a lawnmower made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

An electric lawnmower can include a high voltage wire harness that electrically connects the battery(ies) to the controller, a wire harness that electrically connects the controller to the electric blade motor that drives the blade, and a wire harness that connects the controller to one or more operator inputs. Optionally, the lawnmower can include an additional wire harness that electrically connects the controller to an electric propulsion motor that propels the lawnmower along the ground. Each wire harness can include more than one electric wire and more than one electrical connector. The wire harnesses can add weight and space on the lawnmower. Further, each wire of each wire harness can be subject to damage. A damaged wire can prevent or hinder a desired operation of one or more components of the lawnmower. A damaged wire can cause a short circuit that can damage one or more components of the lawnmower.

The high voltage wire harness can include one or more electric conductors that have relatively thick gauge. It can be difficult to solder the thick gauge wire(s) of the high voltage wire harness onto an electrical terminal connector. The high voltage wire harness can be difficult to manipulate during assembly and/or maintenance/repair due to the tight confines of the housing of the lawnmower. The electrical terminal connector can be relatively large in size, thereby adding to the difficulty in manipulating the high voltage wire harness during assembly and/or maintenance/repair.

The lawnmower can vibrate each of the wire harnesses. Thus, it could be advantageous to provide each wire harness with a wire guide that can reduce at least some of the vibration of the wire harnesses. However, each wire guide can complicate the assembly of the lawnmower.

Electric lawnmowers can be exposed to dust, debris and fluids, when in use, that can have an adverse impact on the controller. The cooling passage(s) can have a complex shape and/or at least one filter structure that reduces the amount of dust, debris and fluids in the air drawn into the lawnmower by the fan. The fan can be operated by the electric motor that drives the cutting blade. The complex shape of the cooling passage(s) and the filters can cause frictional losses and pressure drops that, in turn, can cause the electric motor to consume a relatively high amount of the battery's power. This relatively high power consumption can reduce the running time of the lawnmower for a given charge of the battery.

Accordingly, it can be advantageous to provide an electric lawnmower that can omit at least one high voltage wire harness while maintaining the operations and power distribution of a lawnmower. It can also be advantageous to provide an electric lawnmower with a cooling system that provides sufficient air flowing through the lawnmower while minimizing the power drawn by the fan to move the air through the lawnmower.

Figure 3:
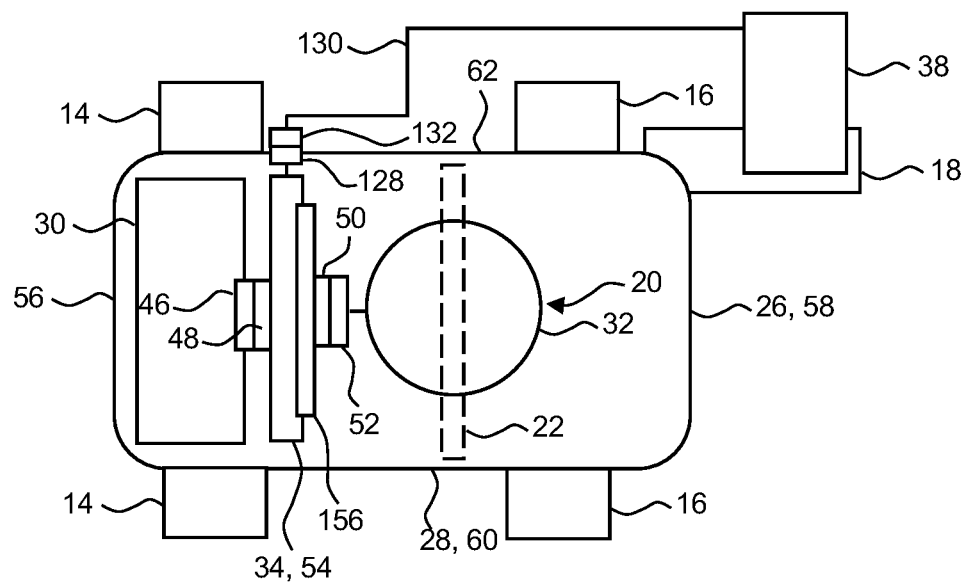
FIG. 3 is a schematic top view of the lawnmower of FIG. 1.

FIG. 1 illustrates an embodiment of a lawnmower 10 made in accordance with principles of the disclosed subject matter. The lawnmower 10 can extend in an X-direction, a Y-direction, and a Z-direction, which directions are orthogonal to each other. The lawnmower 10 can include a cutter housing 12, a pair of front wheels 14, a pair of rear wheels 16, a handle 18 and a control system 20. The rear wheel 16 on the right side of the lawnmower is obstructed from view in FIG. 1 by the cutter housing 12. FIG. 3 schematically illustrates the right rear wheel 16.

Figure 2:
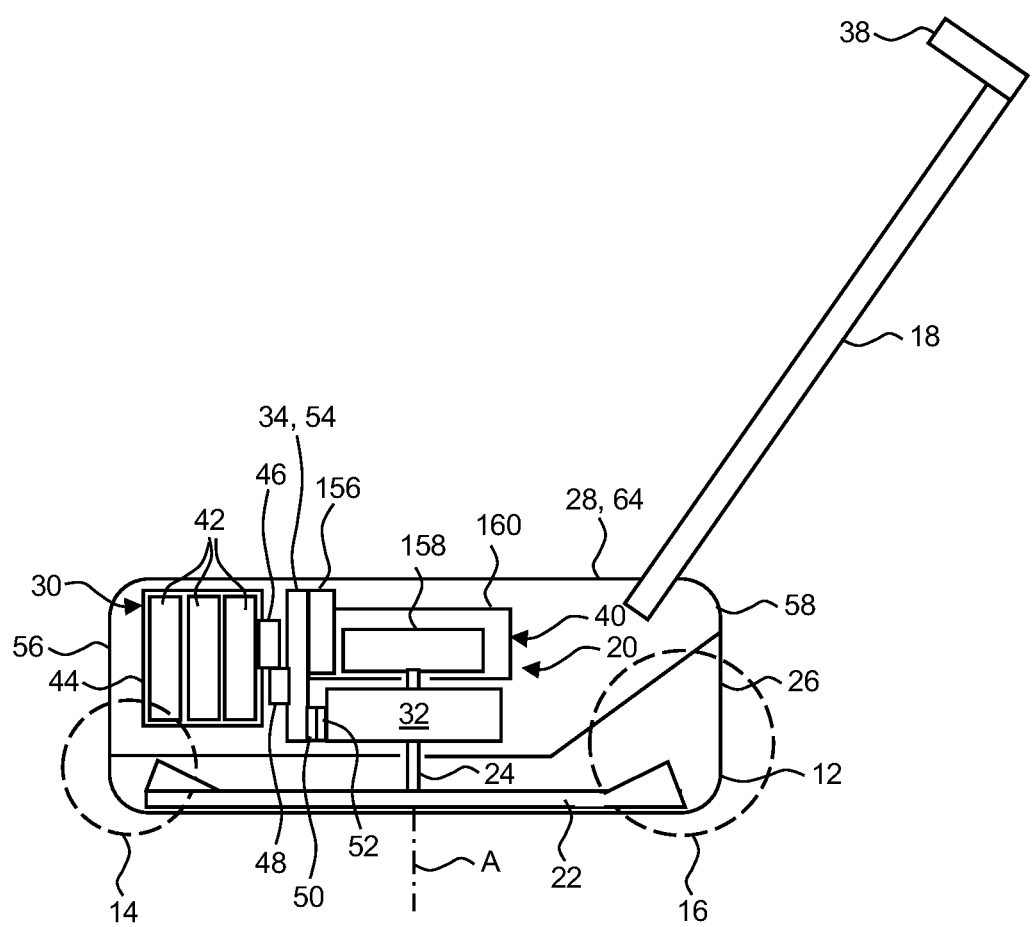
FIG. 2 is a schematic side view of the lawnmower of FIG. 1.

Referring to FIG. 2, the lawnmower 10 can include a blade 22 and a blade shaft 24 connected to each of the blade 22 and the control system 20. The control system 20 can be configured to selectively rotate the blade shaft 24 and the blade 22 in the cutter housing 12 about a blade axis A. The blade shaft 24 can be referred to as a component of the control system 20. Alternatively, the blade shaft 24 can be referred to as a component that is connected to and driven by the control system 20.

Returning to FIG. 1, the cutter housing 12 can be referred to as a mower deck or as a cutter deck or as a deck. The cutter housing 12 can include an opening at a rear end 26 of the cutter housing 12. The lawnmower 10 can include a collection bag 36 that can be selectively attached to and detached from the rear end 26. The opening is omitted for simplicity and clarity of the drawing. The collection bag 36 can be in communication with the opening such that vegetation clippings produced by the blade 22 can be collected in the collection bag 36.

Figure 4:
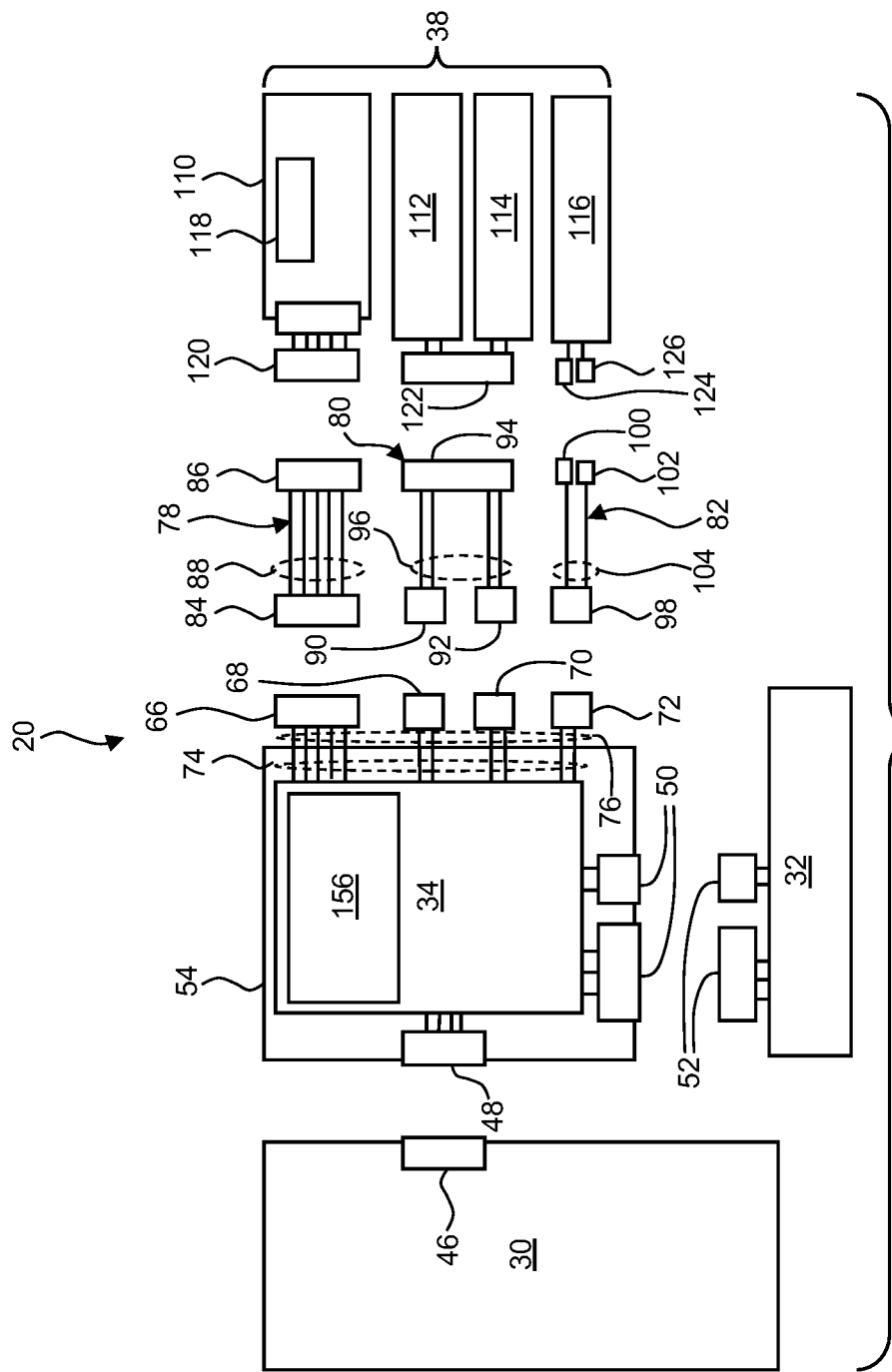
FIG. 4 is an exploded schematic view of a control system of the lawnmower of FIG. 1.

FIGS. 2-4 schematically illustrate exemplary components of the control system 20. The control system 20 can include a housing 28, a battery pack 30, a blade motor 32, a blade motor controller 34, an operator input assembly 38 and a cooling assembly 40. The cooling assembly 40 is omitted from FIGS. 3 and 4 for simplicity and clarity of the drawing figures.

Referring to FIGS. 1-3 collectively, the housing 28 can contain the battery pack 30, the blade motor 32, the blade motor controller 34 and the cooling assembly 40. The housing 28 can include a front end 56, a rear end 58, left side 60, a right side 62 and a top surface 64. The sides 60, 62 can extend along all of the battery pack 30, the blade motor 32, the blade motor controller 34 and a printed circuit board 54 on which the blade motor controller 34 is mounted.

The battery pack 30 can be located in the housing 28 at a position that is adjacent to a front end 54 of the housing 28. Referring to FIG. 2, the battery pack 30 can include at least one battery cell 42 and a case 44 that houses the at least one battery cell 42. The battery cell(s) 42 can be configured to store electricity and supply electricity to the blade motor 32.

The blade motor 32 can be a direct current electric motor or an alternating current electric motor. Embodiments can include a blade motor 32 that is configured as a direct current outer rotor motor that includes an inner stator and an outer rotor. The blade motor 32 can include one or more sensors that provide the blade motor controller 34 with information regarding the temperature, rotational speed, power output, etc., of the blade motor 32. The outer rotor of the blade motor 32 can be directly connected to the blade shaft 24 in any appropriate manner such that the blade motor 32 can cause the blade shaft 24 to rotate.

The blade motor controller 34 can also be referred to as an electronic control unit (ECU) or as a central processing unit. The blade controller 34 can include a processor and a memory storage device. The blade motor controller 34 can be configured with hardware, with or without software, to perform the assigned task(s).

The blade motor controller 34 can be in electrical communication with each of the battery pack 30, the blade motor 32 and the operator input assembly 38. The blade motor controller 34 can be configured to convert power from the battery pack 30 into output power supplied to the blade motor 32. The blade motor controller 34 can be configured to monitor the operational conditions of the blade motor 32 and the battery pack 30. The blade motor controller 34 can be configured to control the voltage and/or current output by the battery pack 30 based on the operational conditions of the blade motor 32 and the battery pack 30 switching one or more power transistors to adjust the supply of electrical power to the blade motor 32.

The blade motor controller 34 can also be configured to control the voltage or current output by the battery pack 30, and to supply the voltage or current to the blade motor 32 using the one or more power transistors based on one or more inputs to the operator input assembly 38 by the operator of the electric lawnmower 10.

The blade motor controller 34 can be configured to initiate, adjust or terminate supply of voltage or current from the battery pack 30 to the blade motor 32 based on inputs received from the operator input assembly 38, the battery pack 30 and the blade motor 32. The blade motor controller 34 can also be configured to regulate the charging of the battery cell(s) 42 of the battery pack 30.

Referring to FIGS. 2-4 collectively, the control system 20 can include a battery connector 46, a first controller connector 48, a second controller connector 50, a motor connector 52 and the printed circuit board 54. Each of the connectors 46, 48, 50, 52 can be an electrical connector that includes a housing and at least one electrically conductive terminal contained in the housing. The battery connector 46 can be mounted on or integrally formed with the case 44. Referring to FIG. 4, the blade motor controller 34, the first controller connector 48 and the second controller connector 50 can be directly mounted on the printed circuit board 54. As a result, the printed circuit board 54 can be directly connected to the battery pack 30 and a large gauge wire conductor for conducting the high voltage from the battery pack 30 to the blade motor controller 32 can be omitted. This can simplify assembly, reduce weight of the lawnmower 10, reduce the manufacturing cost and part cost of the lawnmower, and further fortify the lawnmower 10 against hindered operation or damage due to a short circuit. As will be described in further detail below, directly connecting the printed circuit board 54 to the battery pack 30 can improve the cooling efficiency of the blade motor controller 34 and can reduce the amount of battery power that is consumed by the cooling assembly 40.

Referring to FIG. 4, the control system 20 can include a plurality of input connectors 66, 68, 70, 72, and a plurality of leads 74. Each of the input connectors 66, 68, 70, 72 can include a connector housing, at least one terminal contained within the connector housing, and at least one wire 76 electrically connected to the at least one terminal and extending out of the housing. The lead 74 can be part of the printed circuit of the printed circuit board 54. The wires 76 of the connectors 66, 68, 70, 72 can be soldered onto a respective one of the leads 74. The leads 74 and the connectors 66, 68, 70, 72 can electrically connect the blade motor controller 34 to the operator input assembly 38.

The control system 20 can include a plurality of wire harnesses 78, 80, 82 that can electrically connect the blade motor controller 34 to the operator input assembly 38.

The board wire harness 78 can include a first board harness connector 84, a second board harness connector 86 and a plurality of first wires 88. The first wires 88 can be electrically connected to each of the connectors 84, 86. The first board connector 84 can be physically and electrically connected to the first input connector 66.

The blade wire harness 80 can include a first blade harness connector 90, a second blade harness connector 92, a third blade harness connector 94 and a plurality of second wires 96. The second wires 96 can be electrically connected to the connectors 90, 92, 94 as shown in FIG. 4. The first blade harness connector 90 can be physically and electrically connected to the second input connector 68 and the second blade harness connector 92 can be physically and electrically connected to the third input connector 70.

The fold wire harness 82 can include a first fold harness connector 98, a second fold harness connector 100, a third fold harness connector 102 and a plurality of third wires 104. The third wires 104 can be electrically connected to each of the connectors 98, 100, 102 as shown in FIG. 4. The first fold harness connector 98 can be physically and electrically connected to the fourth input connector 72.

Referring to FIG. 1, the operator input assembly 38 can include a blade operation input 106 and a handle operation input 108. The inputs 106, 108 can be any appropriate structure that can permit the operator of the lawnmower 10 to signal to blade motor controller 34 the operator's intention regarding the operation of the blade motor 32. In FIG. 1, the inputs 106, 108 are show as levers that can be pivotally connected to the handle 18. Instead of the pivoting levers shown in FIG. 1, the inputs 106, 108 can be configured as a push button, a dial, a capacitive sensor or any other appropriate input device.

Returning to FIG. 4, the operator input assembly 38 can include an indicator board 110, a blade switch 112, a handle switch 114 and a folding switch 116. The indicator board 110 can include at least one visual message device 118 that can provide an operator the lawnmower 10 with information regarding the operational status of the lawnmower 10. The visual message device 118 can be a liquid crystal display and/or one or more status lights that are controlled based on one or more signals the visual message device 118 receives from the blade motor controller 34.

The blade switch 112 can be configured to transmit to the blade motor controller 34 a blade ON signal when the operator actuates the blade input 106 and a blade OFF signal when the operator releases the blade input 106. Based on a signal received from the blade switch 112, the blade motor controller 34 can be configured to selectively turn off and on electrical power to the blade motor 32.

The handle switch 114 can be configured to transmit a ready signal when the operator actuates the handle input 108 and a sleep signal when the operator releases both of the blade input 106 the handle input 108. Based on the signal received from the handle switch 114, the blade motor controller 34 can be configured to wake up from or enter a sleep state.

The folding switch 116 can be configured to selectively turn on and off electrical communication between the switches 112, 114 and the blade motor controller 34. The folding switch 116 can be configured to terminate electrical communication between the switches 112, 114 and the blade motor controller 34 when the handle 18 is folded toward the housing 28 and permit electrical communication between the switches 112, 114 and the blade motor controller 34 when the handle 18 is unfolded away from the housing 28 and locked in the use position that is shown in FIG. 1.

The operator input assembly 38 can include an indicator connector 120, a handle connector 122, a first fold connector 124 and a second fold connector 126.

The indicator connector 120 can be electrically connected to the indicator board 110 and the visual message device 118. The indicator connector 120 can be physically and electrically connected the second board harness connector 86.

The handle connector 122 can be electrically connected to each of the blade switch 112 and the handle switch 114. The handle connector 122 can be physically and electrically connected to the third blade harness connector 94.

The fold connectors 124, 126 can be electrically connected to the folding switch 116. The first and second fold connectors 124, 126 can be physically and electrically connected to the second and third fold harness connectors 100, 102, respectively.

FIG. 3 depicts the input connectors 66, 68, 70, 72 collectively as an input connector 128, and the wire harnesses 78, 80, 82 collectively as a lawnmower wire harness 130 that includes a harness connector 132 that is electrically connected to the input connector 128.

Figure 5:
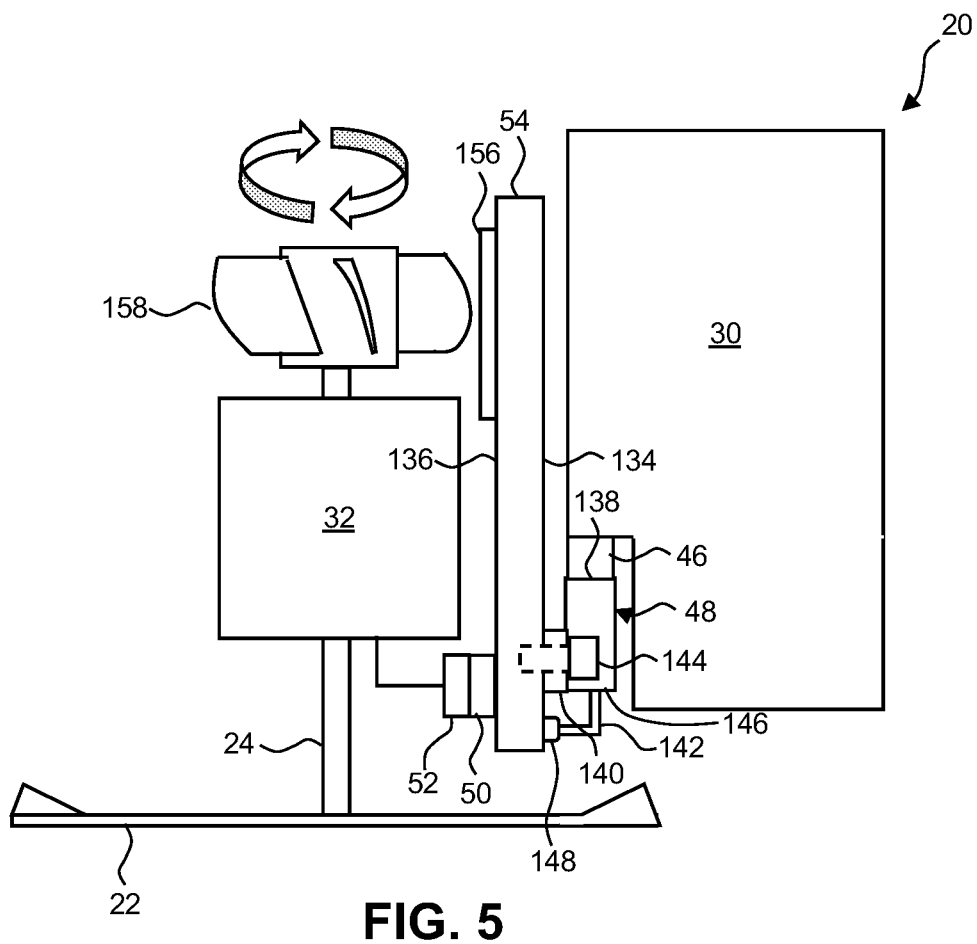
FIG. 5 is schematic side view of the control system of the lawnmower of FIG. 1.
Figure 6:
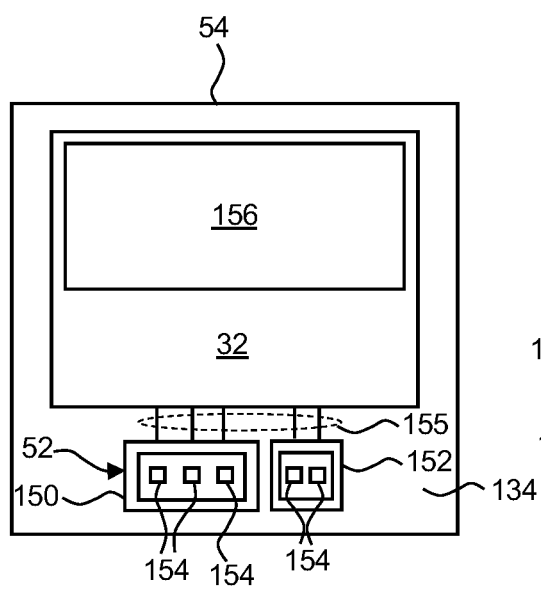
FIG. 6 is a schematic view of a first side of the printed circuit board of FIG. 5.
Figure 7:
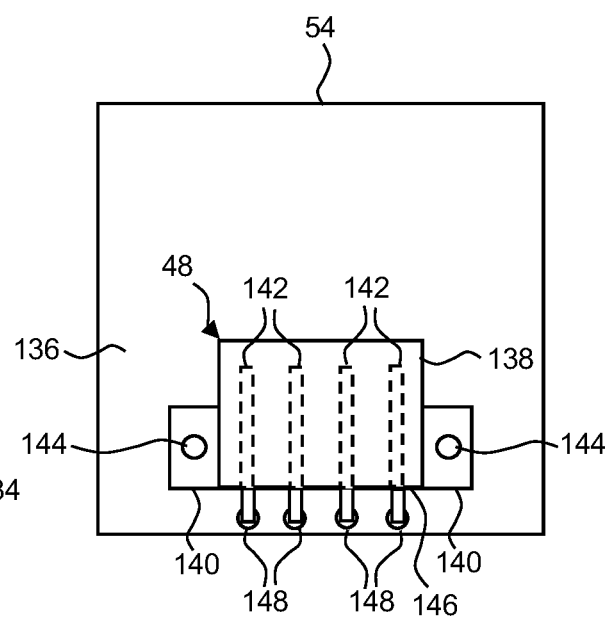
FIG. 7 is a schematic view of a second side of the printed circuit board of FIG. 5.

FIGS. 5-7 show further details of the controller connectors 48, 50. The printed circuit board 54 can include a first side 134 and a second side 136. The first controller connector 48 can be mounted on the first side 134 and the second controller connector 50 can be mounted on the second side 136.

Referring to FIGS. 5 and 7, the first controller connector 48 can include a terminal housing 138, mounting flange 140 and a plurality of electrical terminals 142 mounted in the terminal housing 138. The flange 140 can be a continuous flange that extends across and beyond the terminal housing 138, or the flange 140 can include two separate flanges, one on each side of the terminal housing 138. The flange(s) 140 can be connected to or integrally formed with the terminal housing 138. A pair of screws 144 can connect the first controller terminal 48 to the first side 134 of the printed circuit board 54. The terminals 142 can exit a rear end 146 of the terminal housing 138 and extend toward the printed circuit board 54. The terminals 142 can be electrically connected by solder 148 to a respective lead or via of the printed circuit board 54.

Referring to FIGS. 4 and 6, the second controller connector 50 can include two separate connector housings 150, 152 and a plurality of electrical terminals 154 mounted in the connector housings 150, 152. The printed circuit board 54 can include a plurality of leads 155. The terminals 154 can be connected to the leads 155 of the printed circuit board 54 by solder.

Returning to FIGS. 2, 3, 5 and 6, the cooling assembly 40 of the control system 20 can include a heat sink 156 and a fan 158. The heat sink 156 can be thermally coupled to the blade motor controller 34 such that heat generated by the blade motor controller 34 is transferred by thermal conduction to the heat sink 156. Mounting the printed circuit board 54 directly to the battery pack 30 can permit the printed circuit board 54 to be mounted in a space that separates the fan 158 and the battery pack 30. This feature can permit the heat sink 156 to be positioned in close proximity to the fan 158. The close proximity of the heat sink 156 to the fan 158 can reduce the length of a cooling duct that directs air over the heat sink 156. Accordingly, the power consumption by the fan 158 can be reduced and the charge of the battery pack 30 can be extended as compared to a layout such as that shown in the comparative example of FIG. 9.

Figure 8:
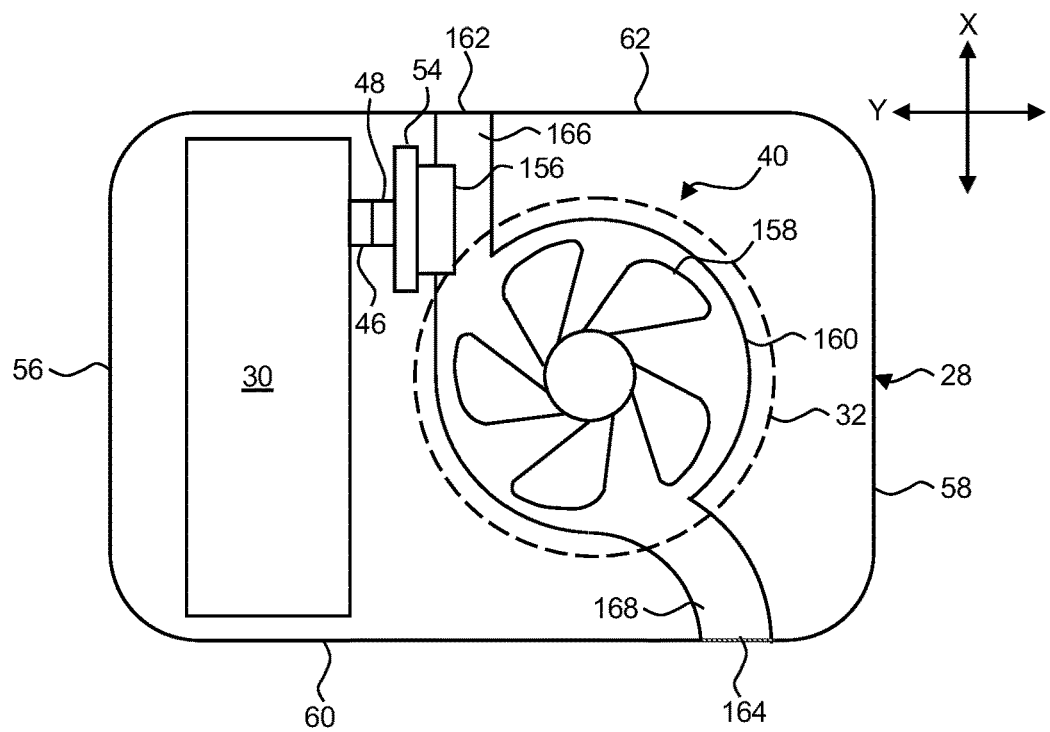
FIG. 8 is a schematic top view of a cooling assembly of the lawnmower of FIG. 1.

Referring to FIG. 8, the cooling system 40 can include a fan housing 160, an inlet 162, an outlet 164, a first ventilation passage 166 and a second ventilation passage 168.

The fan housing 160 can be a portion of the housing 28. In an alternative embodiment, the fan housing 160 can be a separate component from the housing 28. The fan 156 can be located inside the fan housing 160.

Referring to FIGS. 1 and 8, the inlet 162 can be an opening formed on the right side 62 of the housing 28 and the outlet 164 can be an opening formed on the left side 60 of the housing 28. As shown in FIG. 1, the outlet 164 can include a screen or mesh. Although not viewable in FIG. 1, the inlet 162 can also include a screen or mesh as shown for the outlet 164.

The fan housing 160 can be centered between the left side 60 and the right side 62 of the housing 28 in the X-direction of the lawnmower 10. Placing the inlet 162 and the outlet 164 on the right side 62 and the left side 64, respectively, can allow the length of each of the passages 166, 168 to be minimized with respect to other locations of the inlet 162 and 164, such as at the front end 56 and/or the rear end 58 of the housing 28.

The inlet 162 can be located between the fan 158 and the battery pack 30 in the Y-direction of the lawnmower 10. The first ventilation passage 166 can extend from the inlet 162 in the X-direction of the lawnmower 10 and into the space between the fan 158 and the battery pack 30. Connecting the printed circuit board 54 directly to the battery pack 30 can position the heat sink 156 in the space between the fan 158 and the battery pack 30. The heat sink 156 can intersect the first ventilation passage 166 such that at least a portion of the heat sink 156 extends into the first ventilation passages 166, as shown in FIGS. 2 and 8. The relatively short length and substantially straight path of the first ventilation passage 166 can reduce the frictional losses of the air flowing through the first ventilation passage 166. Accordingly, the heat sink 156 can be efficiently cooled with a minimum consumption by the fan 158 of power from the battery pack 30.

The first ventilation passage 166 can extend from the inlet 162 to the fan housing 160 and can be in fluid communication with each of the inlet 162 and the fan housing 160 such that, during operation of the fan 158, air can flow from outside of the housing 28 and enter the fan housing 160 via the inlet 162 and the first ventilation passage 166.

The second ventilation passage 168 can extend from the fan housing 160 to the outlet 164 and can be in fluid communication with each of the fan housing 160 and the outlet 164 such that, during operation of the fan 158, air can flow from the fan housing 160 and exit the outlet 164 via the second ventilation passage 168. The second ventilation passage 168 can form a curved path for the air flowing through the passage 168 and exiting the hosing 28 via the outlet 164.

Figure 9:
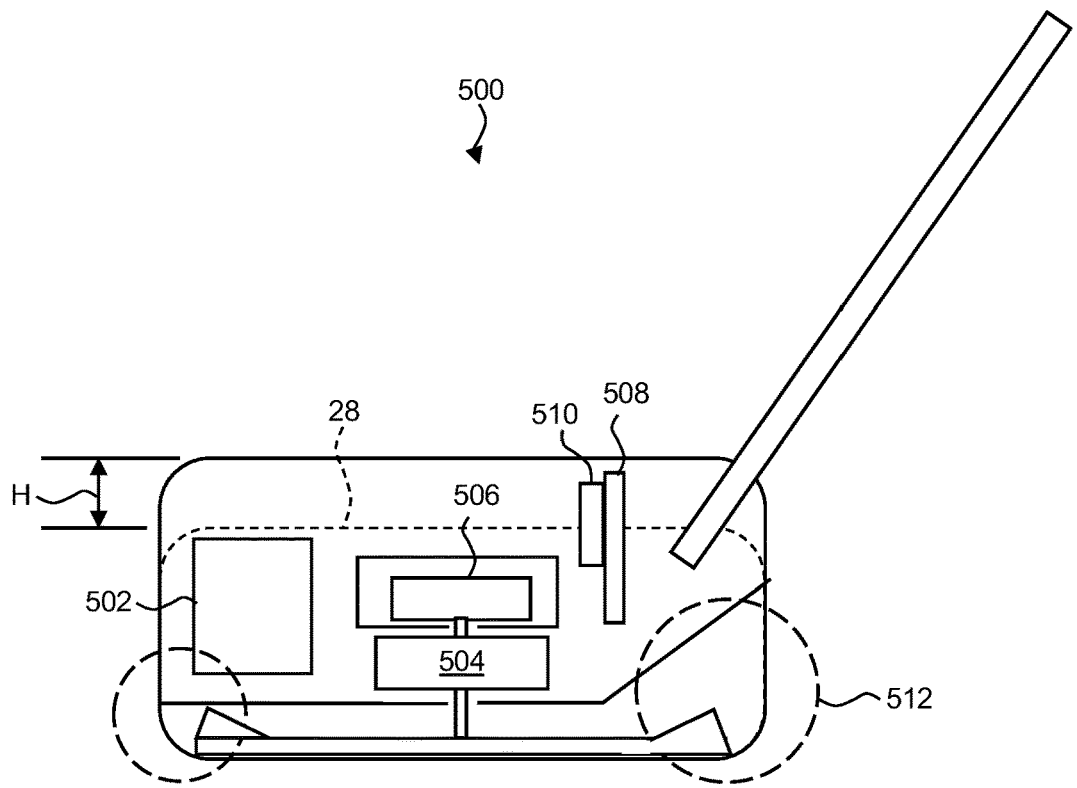
FIG. 9 is a schematic view of a comparative example of an electric lawnmower.

FIG. 9 shows a comparative example lawnmower 500 that includes a battery pack 502, a blade motor 504, a fan 506 and printed circuit board 508. The printed circuit board 508 can include a heat sink 510 and a controller (not shown) that operates the blade motor 504. The printed circuit board 508 and the heat sink 510 can be located between the fan 506 and the rear wheel 512. That is, the printed circuit board 508 and the heat sink 510 are spaced away from a space that extends between the battery pack 502 and the fan 506. A heavy gauge wire harness (not shown) can extend from the printed circuit board 508 to the battery pack 502. In addition to having the assembly, weight, cost and wire harness damage issues discussed above with respect to the heavy gauge wire harness, the printed circuit board 508 can be at an increased elevation relative to the cutter housing 514. The housing 28 of the lawn mower 10 is shown in phantom in FIG. 9 and superimposed on the lawnmower 500. In addition to improving the cooling efficiency and omitting a large gauge wire conductor, locating the printed circuit board 56 and the heat sink 156 of FIGS. 2-8 in the space between the battery pack 30 and the fan 158 can allow the height of the housing 28 to be reduced by a distance H as indicated in FIG. 9. Thus, the lawnmower 10 of FIGS. 1-8 can provide a lower profile—and reduced storage size when the handle 18 is folded onto the housing 28.

While certain embodiments of the invention are described above, it should be understood that the invention can be embodied and configured in many different ways without departing from the spirit and scope of the invention.

For example, embodiments are disclosed above in the context of walk-behind lawnmower shown in FIG. 1. However, exemplary embodiments can include or any type lawnmower described above. For example, the lawnmower can be configured as a ride-on lawnmower. In another alternate embodiment, the lawnmower can be a self-propelled lawnmower to which a stand-on sulky or a sit-on sulky can be attached. However, the above alternative embodiments are merely provided for exemplary purposes, and as indicated above, embodiments are intended to cover any type of type of lawnmower disclosed above.

Alternate embodiments can include a reversed location of the inlet 162 and the outlet 164 such that the inlet 162 is on the left side 60 and the outlet is on the right side 62 of the housing 28.

Alternate embodiments can include the outlet 164 located between the battery pack 30 and the fan 158 in the Y-direction of the lawnmower 10, the second ventilation passage can be substantially straight in the X-direction of the lawnmower 10, and at least a portion of the heat sink 156 can extend into the second ventilation passage 168.

Alternate embodiments can include the fan housing 160 and the fan 158 located below the blade motor 32.

Instead of a wire extending from the blade motor 32 to the motor connector 52 as described above, the motor connector 52 can be mounted on or integrally formed with the housing of the blade motor 32.

Instead of the handle operation input 108, the operator input assembly 38 can include a push button that can actuate the handle switch 114 to cause the handle switch to transmit the output signal in the manner described above.

The operator input assembly 38 can include a main controller mounted on the handle. Instead of the blade motor controller 32, the main controller can be configured to receive the signals from the switches 112, 114, 116. Based on a signal received from the handle switch 114 and/or the folding switch 116, the main controller can be configured to wake up from a sleep state, wake up the blade motor controller 34 from a sleep state, and/or selectively open and close a switch that selectively turns off and on, respectively, electrical output by the battery pack 30. Based on a signal received from the blade switch 112, the main controller 34 can be configured to signal the blade motor controller 34 to selectively turns off and on electrical power to the blade motor 32.

What is claimed is:

1. An electric lawnmower control system comprising:
    a battery;
    an electric motor configured to rotatably drive a blade;
    a fan housing;
    a fan located in the fan housing and rotatably driven by the electric motor;
    a printed circuit board fastened to the battery and including a heat sink that is located adjacent to the fan;
    a motor controller mounted on the circuit board, in electrical communication with the battery and the electric motor, thermally coupled to the heat sink, and configured to selectively drive the electric motor with electric power supplied by the battery; and
    a housing including a first side, a second side, and a ventilation passage extending from the first side to the second side, the ventilation passage is in fluid communication with the fan and the fan housing, and at least a portion of the heat sink is exposed to air flowing through the ventilation passage, wherein
    the heat sink extends into the fan housing.

2. The electric lawnmower control system according to claim 1, further comprising:
    a battery connector mounted on the battery and in electrical communication with the battery; and
    a controller connector mounted on the printed circuit board, physically and electrically connected to the battery connector, and in electrical communication with the motor controller.

3. The electric lawnmower control system according to claim 2, wherein the controller connector includes,
    a terminal housing,
    a plurality of terminals mounted in the terminal housing, soldered to the printed circuit board, and in electrical communication with the motor controller, and
    a mounting flange that extends from the terminal housing and is fastened to the printed circuit board by at least one screw.

4. The electric lawnmower control system according to claim 1, further comprising:
    a motor connector electrically connected to the electric motor; and
    a controller connector mounted on the printed circuit board, physically and electrically connected to the motor connector, and in electrical communication with the motor controller.

5. The electric lawnmower control system according to claim 4, wherein the controller connector includes,
    a terminal housing,
    a plurality of terminals mounted in the terminal housing, soldered onto the printed circuit board, and in electrical communication with the motor controller, and
    a mounting flange that extends from the terminal housing and is fastened to the printed circuit board by at least one screw.

6. The electric lawnmower control system according to claim 1, further comprising:
    a first connector in electrical communication with the motor controller;
    a second connector in electrical communication with the motor controller; and
    a motor wire harness including at least one motor connector and a plurality of wires electrically connected to the motor and the motor connector, the motor connector is physically and electrically connected to the second connector, wherein
    the printed circuit board includes a first side that faces the battery and a second side that faces the fan and the electric motor,
    the second connector is mounted on the second side of the printed circuit board,
    the first connector is mounted on the first side of the printed circuit board, and
    the battery includes a battery connector that is physically and electrically connected to the first connector.

7. The electric lawnmower control system according to claim 1, wherein
    the fan and the electric motor are separated from the battery by a space, and
    the printed circuit board is located in the space.

8. The electric lawnmower control system according to claim 1, wherein the printed circuit board is located between the battery and the fan.

9. The electric lawnmower control system according to claim 1, wherein the printed circuit board is located between the battery and the electric motor.

10. The electric lawnmower control system according to claim 1, wherein the housing contains the battery, the electric motor, the fan, and the printed circuit board.

11. The electric lawnmower control system according to claim 1, wherein the battery, the electric motor, the fan and the printed circuit board are located between the first side and the second side.

12. The electric lawnmower control system according to claim 1, wherein the first side and the second side extend along all of the battery, the electric motor, the fan and the printed circuit board.

13. The electric lawnmower control system according to claim 1, wherein
    the electric motor and the fan are located inside the housing
    the housing includes a front end and a rear end,
    the battery is mounted in the housing at a location that is adjacent to the front end and between the front end and the fan,
    the first side extends from the front end to the rear end, and
    the second side extends from the front end to the rear end.

14. An electric lawnmower comprising:

the control system according to claim 1;
a cutter housing;
a shaft driven by the electric motor
a plurality of wheels support the cutter housing;
a handle connected to the cutter housing and extending away from the cutter housing; and
at least one control input mounted on the handle and in electrical communication with the motor controller, wherein
the electric motor is mounted on and supported by the cutter housing,
the housing is mounted on the cutter housing,
the blade is located in the cutter housing and connected to the shaft, and
the fan is connected to the shaft.

15. The electric lawnmower according to claim 14, wherein
the plurality of wheels includes a pair of front wheels and a pair of rear wheels that are spaced away from the front wheels in a first direction,
the ventilation passage includes an inlet on the first side of the housing and an outlet on the second side of the housing, and
the outlet is spaced away from the inlet in a direction that intersects the first direction.

16. A control system for an electric lawnmower, comprising:
a battery assembly including a battery case and at least one battery mounted in the battery case;
an electric motor configured to rotatably drive a blade;
a motor connector electrically connected to the electric motor;
a fan rotatably driven by the electric motor;
a printed circuit board mounted on the battery and including a heat sink that is located adjacent to the fan;
a motor controller mounted on the circuit board, in electrical communication with the battery, thermally coupled to the heat sink, and configured to selectively drive the electric motor with electric power supplied by the battery;
a first connector mounted on the printed circuit board and in electrical communication with the motor controller, physically and electrically connected to the motor connector, and in electrical communication with the motor controller; and
a housing including a first side, a second side, and a ventilation passage extending from the first side to the second side, the ventilation passage is in fluid communication with the fan, and at least a portion of the heat sink is exposed to air flowing through the ventilation passage.

17. The control system according to claim 16, further comprising:
a second connector mounted on the printed circuit board and in electrical communication with the motor controller; and
a motor wire harness including at least one motor connector and a plurality of wires electrically connected to the motor and the motor connector, the motor connector is physically and electrically connected to the first connector, wherein
the battery assembly includes a battery connector mounted on the battery case, and
the battery connector is physically and electrically connected to the second connector.

18. A control system for an electric lawnmower, comprising:
a battery assembly including a battery case and at least one battery mounted in the battery case;
an electric motor configured to rotatably drive a blade;
a fan housing;
a fan located in the fan housing and rotatably driven by the electric motor;
a motor controller in electrical communication with the battery and the electric motor and configured to selectively drive the electric motor with electric power supplied by the battery; and
a heat sink thermally coupled to the motor controller and located adjacent to the fan; and
a housing including a first side, a second side, and a ventilation passage extending from the first side to the second side, the ventilation passage is in fluid communication with the fan, the fan housing, and at least a portion of the heat sink, wherein
the heat sink extends into the fan housing.

19. The control system according to claim 18, further comprising:
a printed circuit board;
a first connector mounted on the circuit board and in electrical communication with the motor controller;
a second connector mounted on the circuit board and in electrical communication with the motor controller;
a battery connector on the battery case, in electrical communication with the battery, and physically and electrically connected to the first connector; and
a motor connector in electrical communication with the electric motor, and physically and electrically connected to the second connector.

* * * * *